US008968910B2

(12) United States Patent
Kim et al.

(10) Patent No.: US 8,968,910 B2
(45) Date of Patent: Mar. 3, 2015

(54) LITHIUM SECONDARY BATTERY HAVING MULTI-DIRECTIONAL LEAD-TAB STRUCTURE

(75) Inventors: Bo Hyun Kim, Daejeon (KR); Ji Hyun Kim, Gyeonggi-do (KR)

(73) Assignee: LG Chem, Ltd. (KR)

( * ) Notice: Subject to any disclaimer, the term of this patent is extended or adjusted under 35 U.S.C. 154(b) by 822 days.

(21) Appl. No.: 13/054,974

(22) Filed: Jan. 20, 2011

(65) Prior Publication Data

US 2013/0196210 A1 Aug. 1, 2013

Related U.S. Application Data

(63) Continuation of application No. PCT/KR2010/009129, filed on Dec. 20, 2010.

(51) Int. Cl.
| | |
|---|---|
| *H01M 6/46* | (2006.01) |
| *H01M 10/0585* | (2010.01) |
| *H01M 2/30* | (2006.01) |
| *H01M 2/26* | (2006.01) |
| *H01M 10/04* | (2006.01) |
| *H01M 10/052* | (2010.01) |

(52) U.S. Cl.
CPC ............ *H01M 10/0585* (2013.01); *H01M 2/30* (2013.01); *H01M 2/266* (2013.01); *H01M 10/0436* (2013.01); *H01M 10/052* (2013.01); *H01M 10/0413* (2013.01); *Y02E 60/122* (2013.01)
USPC ........................................ 429/153

(58) Field of Classification Search
CPC ...................................... H01M 10/585
USPC ........................... 429/158, 159, 160
See application file for complete search history.

(56) References Cited

U.S. PATENT DOCUMENTS 4,409,304 A * 10/1983 Gerard et al. ............... 429/158
5,104,752 A    4/1992 Baughman et al.
(Continued)

FOREIGN PATENT DOCUMENTS

| CN | 200953357 Y | 9/2007 |
|---|---|---|
| CN | 101312241 A | 11/2008 |

(Continued)

OTHER PUBLICATIONS

International Search Report for Application No. PCT/KR2010/009129 dated Sep. 7, 2011.

(Continued)

*Primary Examiner* — Patrick Ryan
*Assistant Examiner* — Stephan Essex
(74) *Attorney, Agent, or Firm* — Lerner, David, Littenberg, Krumholz & Mentlik, LLP (57) ABSTRACT

A lithium rechargeable battery, and more particularly, a lithium rechargeable battery having a multidirectional lead-tab structure is provided. The lithium rechargeable battery includes: an electrode assembly in which a separator and an electrode plate having a current collector, an active material, and a tab are alternately stacked; a lead electrically connected to the tab; and a battery case, wherein the lead is divided into a positive electrode lead and a negative electrode lead, and at least one positive electrode lead and at least one negative electrode lead are provided. The lithium rechargeable battery is appropriate for using a high current even while using a conventional lead-tab size.

3 Claims, 12 Drawing Sheets

(56) References Cited

U.S. PATENT DOCUMENTS

| | | | |
|---|---|---|---|
| 5,487,958 A * | 1/1996 | Tura | 429/159 X |
| 6,045,943 A * | 4/2000 | Nowaczyk | 429/160 |
| 6,881,514 B2 * | 4/2005 | Ahn et al. | 429/158 X |
| 2008/0292952 A1 | 11/2008 | Yanagihara et al. | |
| 2009/0305134 A1 * | 12/2009 | Ryu | 429/211 |
| 2009/0317717 A1 | 12/2009 | Ryu et al. | |

FOREIGN PATENT DOCUMENTS

| | | |
|---|---|---|
| EP | 1998400 A2 | 12/2008 |
| JP | H02-134652 A | 5/1990 |
| JP | H06-502043 A | 3/1994 |
| JP | 06-031070 U | 4/1994 |
| JP | 06-056963 U | 8/1994 |
| JP | 09035721 A | 2/1997 |
| JP | H10233201 A | 9/1998 |
| JP | 2004047239 A * | 2/2004 |
| JP | 2005-203192 A | 7/2005 |
| JP | 2006252855 A | 9/2006 |
| JP | 2010-205632 A | 9/2010 |
| JP | 2010225496 A | 10/2010 |
| JP | 2012-054197 A | 3/2012 |
| KR | 20040005015 A | 1/2004 |
| KR | 20070033983 | 3/2007 |
| KR | 20070091877 A | 9/2007 |
| KR | 20080008245 A | 1/2008 |
| KR | 20100135382 A | 12/2010 |
| WO | 2005117163 A1 | 12/2005 |

OTHER PUBLICATIONS

Office Action dated Sep. 2, 2014 from Chinese Application No. 201080069083.X.

* cited by examiner

FIG. 14

LITHIUM SECONDARY BATTERY HAVING MULTI-DIRECTIONAL LEAD-TAB STRUCTURE

CROSS REFERENCE TO RELATED APPLICATION

The present application is a continuation of International Application No. PCT/KR2010/009129, filed Dec. 20, 2010, published in Korean. The disclosures of said applications are incorporated by reference herein.

BACKGROUND OF THE INVENTION

1. Field of the Invention

The present invention relates to a lithium rechargeable battery, and more particularly, to a lithium rechargeable battery having a multidirectional lead-tab structure.

2. Related Art

A rechargeable battery is classified according to a structure form of an electrode assembly having a positive electrode/separator/negative electrode structure and includes a jellyroll (winding type) electrode assembly of a structure in which long sheet type positive electrodes and negative electrodes are wound with a separator interposed therebetween, a stack type electrode assembly of a structure in which a plurality of positive electrodes and negative electrodes cut in a predetermined size are sequentially stacked with a separator interposed therebetween, and a stack/folding type electrode assembly of a structure that winds bi-cells or full cells in which a predetermined unit of positive electrodes and negative electrodes are stacked with a separator interposed therebetween.

Nowadays, interest has increased in a pouch type battery of a structure in which a stack type electrode assembly or a stack/folding type electrode assembly is housed in a pouch type battery case of an aluminum laminate sheet due to a low production cost, a small weight, and easy form modification, and use of the pouch type battery gradually increases.

Figure 1:
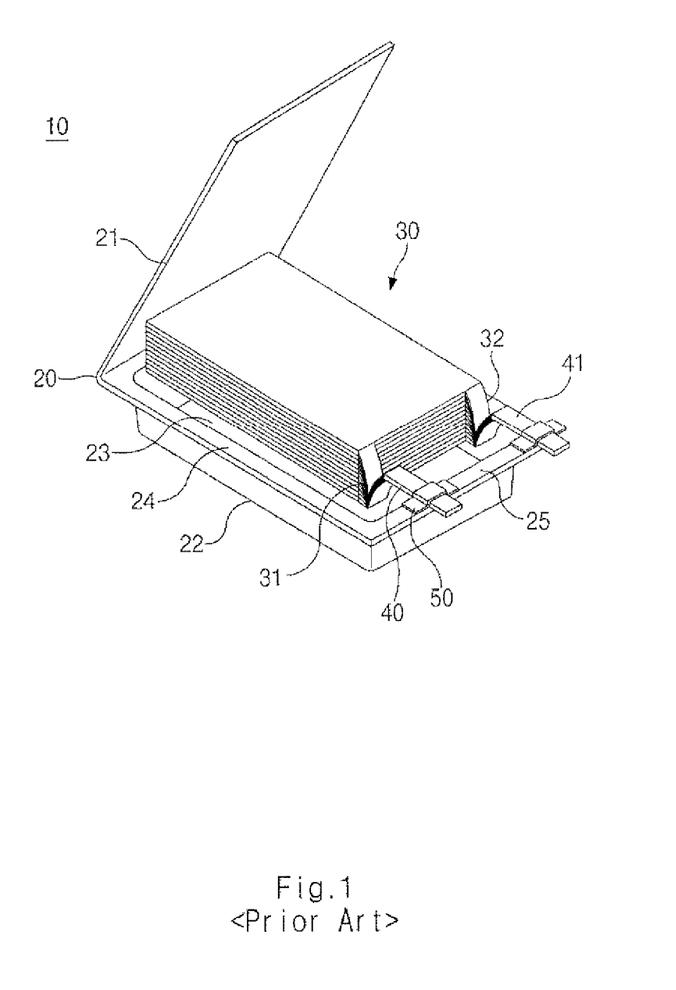
FIGS. 1 and 2 are perspective views illustrating a conventional typical pouch type rechargeable battery.

FIG. 1 is an exploded perspective view illustrating a conventional typical pouch type rechargeable battery.

Referring to FIG. 1, a pouch type rechargeable battery 10 includes an electrode assembly 30, electrode tabs 31 and 32 extended from the electrode assembly 30, electrode leads 40 and 41 welded to the electrode tabs 31 and 32, and a battery case 20 for housing the electrode assembly 30.

The electrode assembly 30 is a power generation element in which a positive electrode and a negative electrode are sequentially stacked with a separator interposed therebetween and is formed in a stack type structure or a stack/folding type structure. The electrode tabs 31 and 32 are extended from each electrode plate of the electrode assembly 30, and the electrode leads 40 and 41 are electrically connected by, for example, welding to a plurality of electrode tabs 31 and 32, respectively, extended from each electrode plate, and a part thereof is exposed to the outside of the battery case 20. Further, in order to secure an electrical insulation state while increasing a sealing degree with the battery case 20, an insulation film 50 is attached to a part of an upper surface and a lower surface of the electrode leads 40 and 41.

The battery case 20 includes a case body 22 including a concave shape of reception portion 23 for receiving the electrode assembly 30 and a cover 21 that is integrally connected to the case body 22, and in a state where the electrode assembly 30 is received in the reception portion 23, by bonding an upper end portion 25 and a both side portion 24, which are contact portions, a battery is complete. Because the battery case 20 is formed in an aluminum laminate structure of a resin layer/metal thin layer/resin layer, by applying a heat and a pressure to the upper end portion 25 and the both side portion 24 of the contacting cover 21 and case body 22, a resin layer is fused and bonds them. Because the same resin layer of the upper and lower battery case 20 directly contacts, the both side portion 24 can be uniformly sealed by melting. However, because the electrode leads 40 and 41 are protruded from the upper end portion 25, in order to improve a sealing property in consideration of a thickness of the electrode leads 40 and 41 and a material of the electrode leads 40 and 41 different from that of the battery case 20, by performing thermal fusion with an insulation film 50 interposed between the electrode leads 40 and 41, a battery is finally manufactured.

Figure 2:
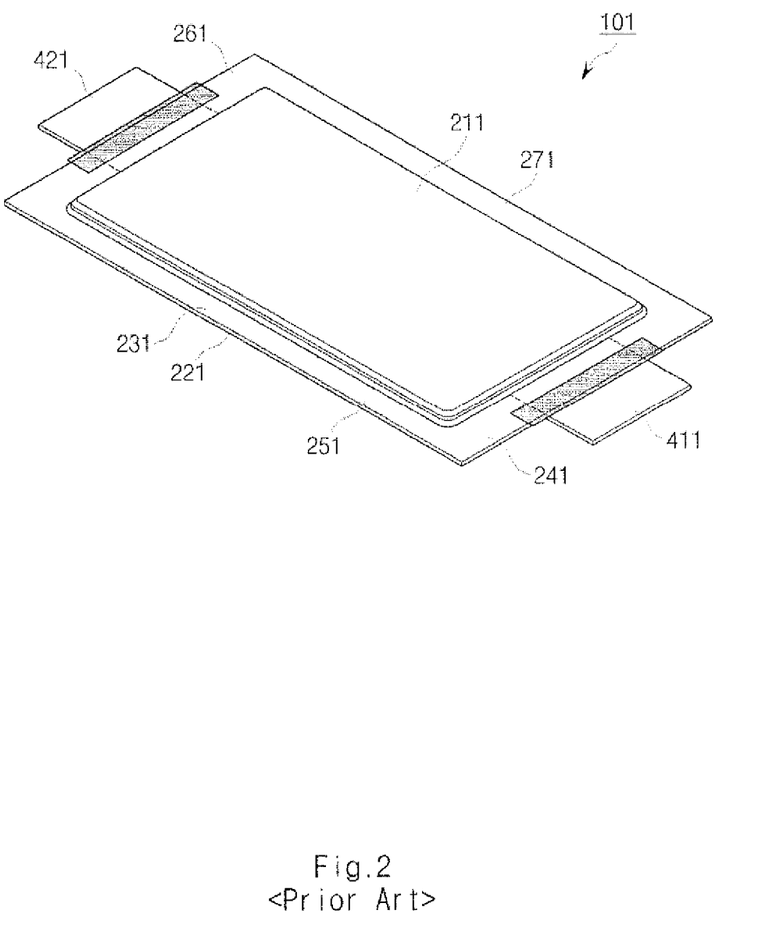

FIG. 2 is an example of another pouch type battery and is a perspective view illustrating a pouch type battery in which an electrode lead is protruded from each of an upper part and a lower part of a battery case.

A pouch type battery 101 of FIG. 2 is different from the pouch type battery of FIG. 1 in that electrode leads 411 and 421 are positioned at an upper part and a lower part, respectively and a battery case is separated as a lower case 221 and an upper case 231. Therefore, in the battery case, the lower case 221 and the upper case 231 are bonded by thermocompression and an upper sealing portion 241, a lower sealing portion 261, and both side surface sealing portions 251 and 271 are formed. A reception portion 211 may be formed only in the upper case 231 or the lower case 221, or in both the upper case 231 and the lower case 221.

As shown in FIGS. 1 and 2, in a conventional battery, after electrode plates are stacked so that tabs of the same polarity are aligned at the same position in an axial direction, by welding tabs of the same polarity with one positive electrode or one negative electrode, a battery is manufactured.

A battery manufactured in this way may be used as a battery of a small capacity use, but when a battery manufactured in this way is used as a medium and large battery use using a large current, a problem may occur. That is, when the battery is used for use requiring much energy, such as a vehicle, as a magnitude of a current passing through a lead increases, much heat generates and thus a problem may occur from a safety point of view.

In order to solve such a problem, a method of increasing a thickness or a width of a lead-tab may be used, but in this case, a sealing property of a lead-tab portion may be not good and thus a problem that moisture penetrates into the portion may occur. Further, because a lead and a tab having no standard size are used in a mass production process, difficulty may arise in a production process.

Therefore, a demand for a battery appropriate for using a high current even while using a conventional lead-tab size has been increased.

SUMMARY OF THE INVENTION

The present invention has been made in view of the above problems, and provides a battery manufactured by alternately stacking electrode plates so that tabs of electrode plates of the same form have different directions and by welding the electrode plate with a lead.

In accordance with an aspect of the present invention provides a lithium rechargeable battery including: an electrode assembly in which a separator and an electrode plate having a current collector, an active material, and a tab are alternately stacked; a lead electrically connected to the tab; and a battery case, wherein the lead is divided into a positive electrode lead and a negative electrode lead, and at least one positive electrode lead and at least one negative electrode lead are provided.

In accordance with another aspect of the present invention provides a lithium rechargeable battery including: an electrode assembly in which a separator and an electrode plate having a current collector, an active material, and a tab are alternately stacked; a lead electrically connected to the tab; and a battery case, wherein the lead is divided into a positive electrode lead and a negative electrode lead, and at least two positive electrode leads and at least two negative electrode leads are provided.

The electrode assembly may be formed by alternately stacking electrode plates and separators so that tabs of electrode plates of the same polarity have different axial direction positions, and the lead may be provided at a position corresponding to the tab position.

The electrode assembly may be formed by alternately stacking electrode plates and separators so that tabs of electrode plates of different polarity have different axial direction positions, and the leads may be provided at positions corresponding to the tab positions.

The electrode assembly may have a rectangular cross-sectional shape, and the positive electrode lead and the negative electrode lead may be each selectively provided at four sides of the electrode assembly.

The positive electrode lead and the negative electrode lead may be formed in the same direction at one side of four sides of the electrode assembly formed in a rectangular cross-sectional shape, the positive electrode lead and the negative electrode lead may be each dividedly formed at adjacent sides of four sides of the electrode assembly formed in a rectangular cross-sectional shape, or the positive electrode lead and the negative electrode lead may be each formed opposite to two opposing sides of four sides of the electrode assembly formed in a rectangular cross-sectional shape.

The quantity of the positive electrode lead and the quantity of the negative electrode lead may be equal or different, and if the quantity of the positive electrode lead and the quantity of the negative electrode lead is different, the quantity of the negative electrode lead may be smaller than that of the positive electrode lead.

A width of the positive electrode lead and the negative electrode lead may be in a range of 1 to 10 cm.

A thickness of the positive electrode lead and the negative electrode lead may be in a range of 50 to 500 µm.

The lithium rechargeable battery may be used for a large area battery.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE PREFERRED EMBODIMENTS

Hereinafter, a lithium rechargeable battery according to exemplary embodiments of the present invention will be described in detail with reference to the accompanying drawings. The exemplary embodiments should be considered in descriptive sense only and not for purposes of limitation. Therefore, the scope of the invention is defined not by the detailed description of the invention but by the appended claims.

Figure 3:
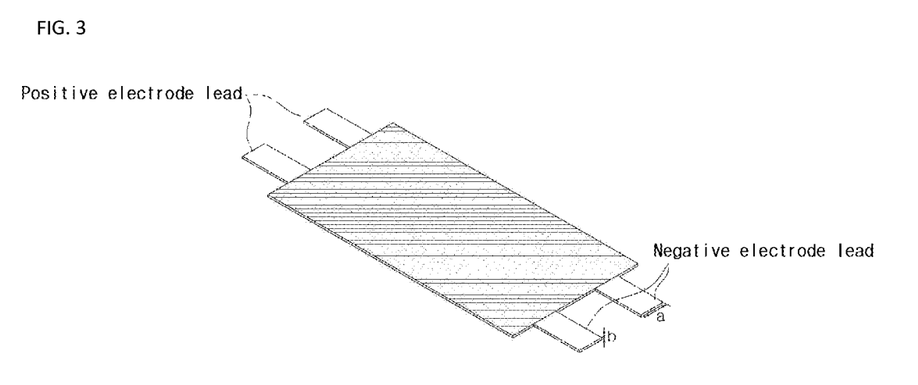
FIGS. 3 and 4 are schematic diagrams illustrating a rechargeable battery according to an exemplary embodiment of the present invention.
Figure 4:
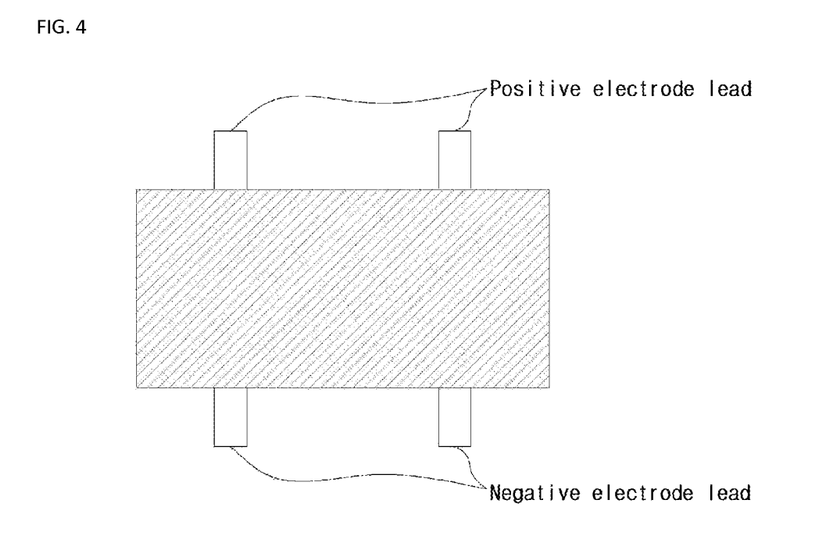

FIGS. 3 and 4 are schematic diagrams illustrating a rechargeable battery according to an exemplary embodiment of the present invention.

The present invention provides a lithium rechargeable battery including an electrode assembly in which a separator and an electrode plate having a current collector, an active material, and a tab are alternately stacked; a lead electrically connected to the tab; and a battery case, wherein the lead is divided into a positive electrode lead and a negative electrode lead, and at least two positive electrode leads and at least two negative electrode leads are provided.

That is, the present invention is characterized in that at least two positive electrode leads and at least two negative electrode leads are provided, unlike conventional technology in which a positive electrode lead and a negative electrode lead are provided. This is to distribute a current by providing two or more leads instead of providing one lead, unlike conventional technology.

In this case, the electrode assembly is formed by alternately stacking electrode plates and separators so that tabs of electrode plates of the same polarity have different axial direction positions, and leads are provided at positions corresponding to the tab positions. A meaning that axial direction positions of tabs are different is that positions of tabs are different when viewed in an axial direction.

As shown in FIG. 1, conventionally, by stacking electrode plates so that tabs of electrode plates of the same polarity have the same axial direction positions, an electrode assembly is formed, but the present invention is characterized in that electrode plates are alternately stacked so that tabs of identical electrode plates have at least two axial direction positions. By stacking the electrode plates in this way, the electrode plate is easily welded with at least two positive electrode leads and at least two negative electrode leads.

In an electrode assembly formed in a rectangular cross-sectional shape, the electrode lead may be selectively provided at four sides of the electrode assembly, as needed. For example, FIG. 3 shows that two positive electrode leads and two negative electrode leads are formed at each of two short sides of four sides, and FIG. 4 shows that two positive electrode leads and two negative electrode leads are formed at each of two long sides of four sides.

In an exemplary embodiment described in relation to FIGS. 3 and 4, two positive electrode leads and two negative electrode leads are formed, but the present invention is not limited thereto and three or more positive electrode leads and three or more negative electrode leads may be formed.

Particularly, it is preferable that a width a of the positive electrode lead and the negative electrode lead used in the present exemplary embodiment is in a range of 1 to 10 cm and a thickness b of the positive electrode lead and the negative electrode lead is in a range of 50 to 500 μm.

If the width a and the thickness b is less than the range, a magnitude of a current passing through the lead increases and thus heat generation increases, whereby it is not preferable from safety point of view. Particularly, in a large area battery requiring much energy, the above-described problem may occur. Here, the large area battery is a battery in which an area of an electrode assembly is largely manufactured in order to charge and discharge much energy and is generally a battery manufactured in a size of about 225 cm$^2$ or more).

If the width a and the thickness b is greater than the range, a sealing property of a lead-tab portion may not be good and thus a moisture penetration problem may occur in the portion. Further, because the width a and the thickness b deviate from a size of a lead manufactured by punching, difficulty may arise in a manufacturing process.

Figure 5:
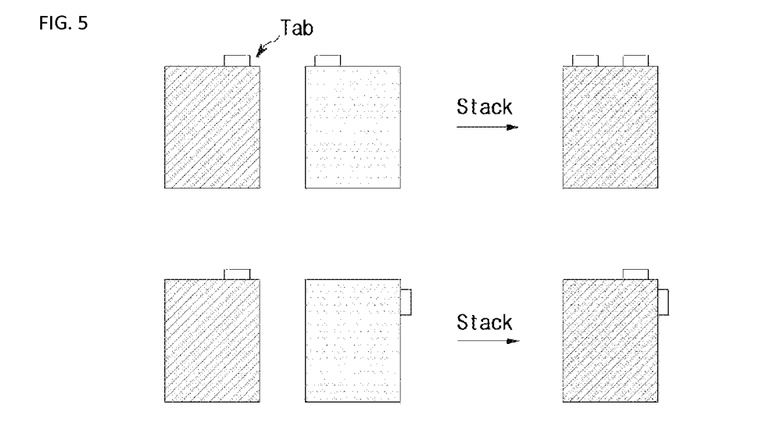
FIGS. 5 and 6 are diagrams illustrating a method of stacking an electrode plate.
Figure 6:
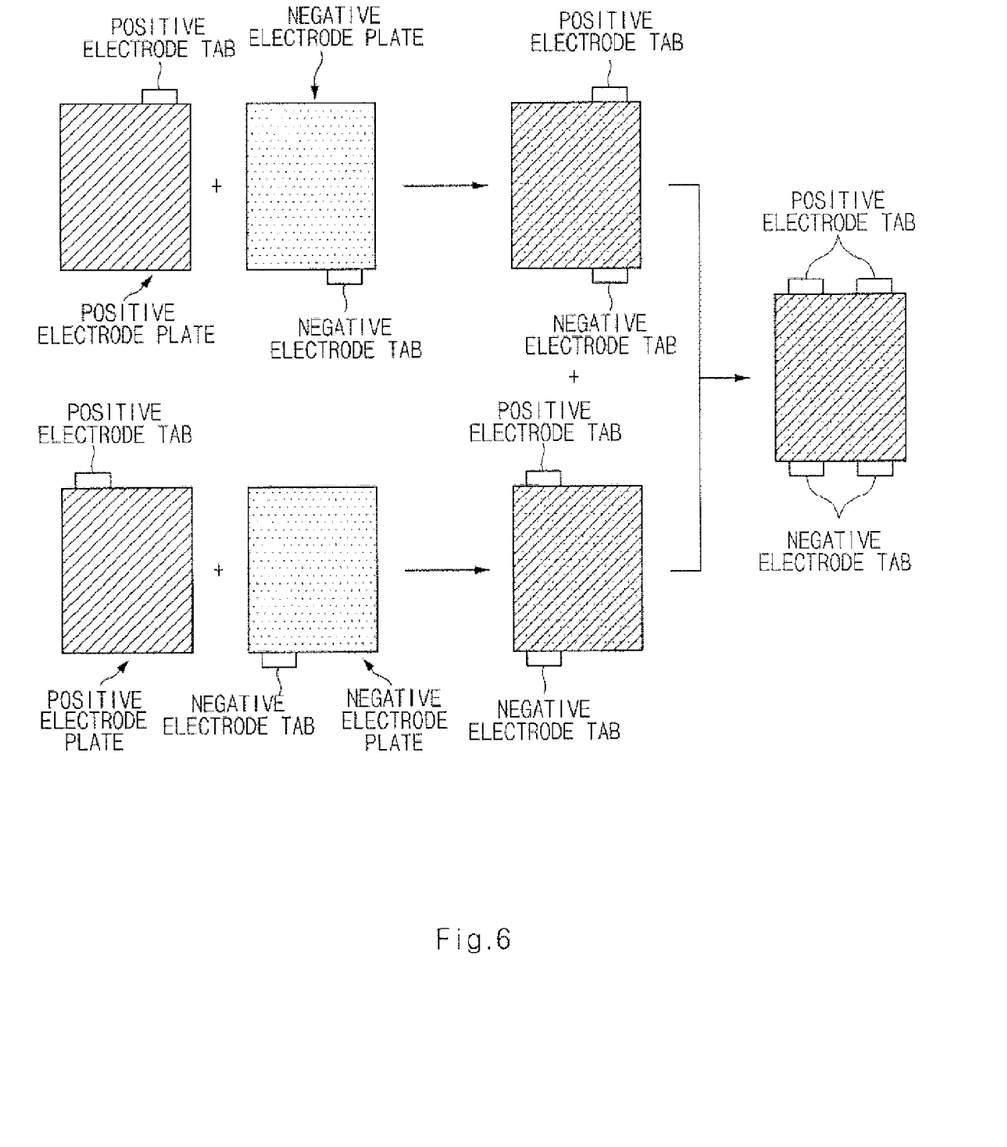
Figure 7:
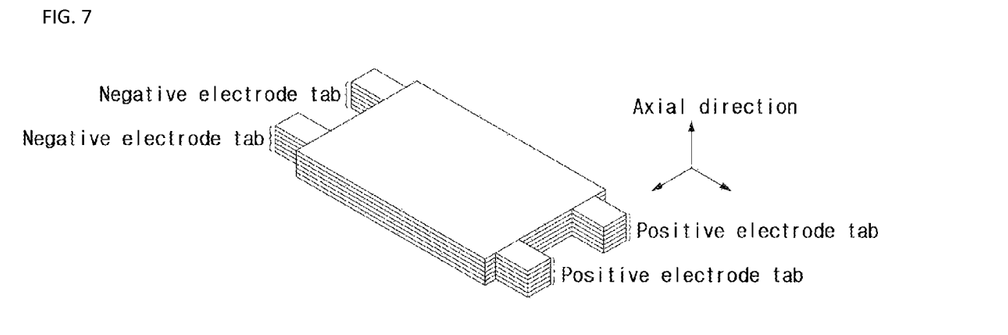
FIG. 7 is a perspective view illustrating an electrode assembly in which electrode plates are stacked according to an exemplary embodiment of the present invention.

FIGS. 5 to 7 are diagrams schematically illustrating a process of forming an electrode assembly according to an exemplary embodiment of the present invention.

FIG. 5 illustrates a stacking concept of an electrode assembly according to an exemplary embodiment of the present invention.

As shown in FIG. 5, when identical electrode plates are sequentially alternately stacked so that tabs of identical electrode plates have different axial direction positions, tabs of identical electrode plates may have at least two different axial direction positions. By welding the tab to each of the positive electrode lead and the negative electrode lead, a battery is formed.

In this case, the positive electrode lead and the negative electrode lead may be formed in the same direction at one side of four sides of an electrode assembly formed in a rectangular cross-sectional shape, as shown in an upper drawing of FIG. 5, or may be dividedly formed at adjacent sides, as shown in a lower drawing of FIG. 5. Although not shown, a positive electrode lead and a negative electrode lead may be formed opposite at each of two opposing sides of four sides of the electrode assembly.

FIG. 6 illustrates a process of manufacturing a battery according to an exemplary embodiment of the present invention.

As shown in FIG. 6, the electrode assembly is formed by alternately stacking electrode plates and separators so that tabs of electrode plates of different polarity have different axial direction positions, and leads are provided at positions corresponding to the tab positions.

Thereby, a positive electrode plate and a negative electrode plate in which an axial direction position of a tab is right-biased are prepared, a separator is interposed therebetween, and then by stacking them, a first stacking body is formed.

Thereafter, a positive electrode plate and a negative electrode plate in which an axial direction position of a tab is left-biased are prepared (in a positive electrode plate and a negative electrode plate in which an active material is applied at both side surfaces of a current collector, when the right-biased positive electrode plate and negative electrode plate are inverted, a left-biased positive electrode plate and negative electrode plate may be formed), a separator is interposed therebetween, and then by stacking them, a second stacking body is formed.

After a separator is interposed between the first stacking body and the second stacking body, by repeating a method of stacking them, an electrode assembly in which axial direction positions of tabs are different is finally complete, as shown in FIG. 7.

Figure 8:
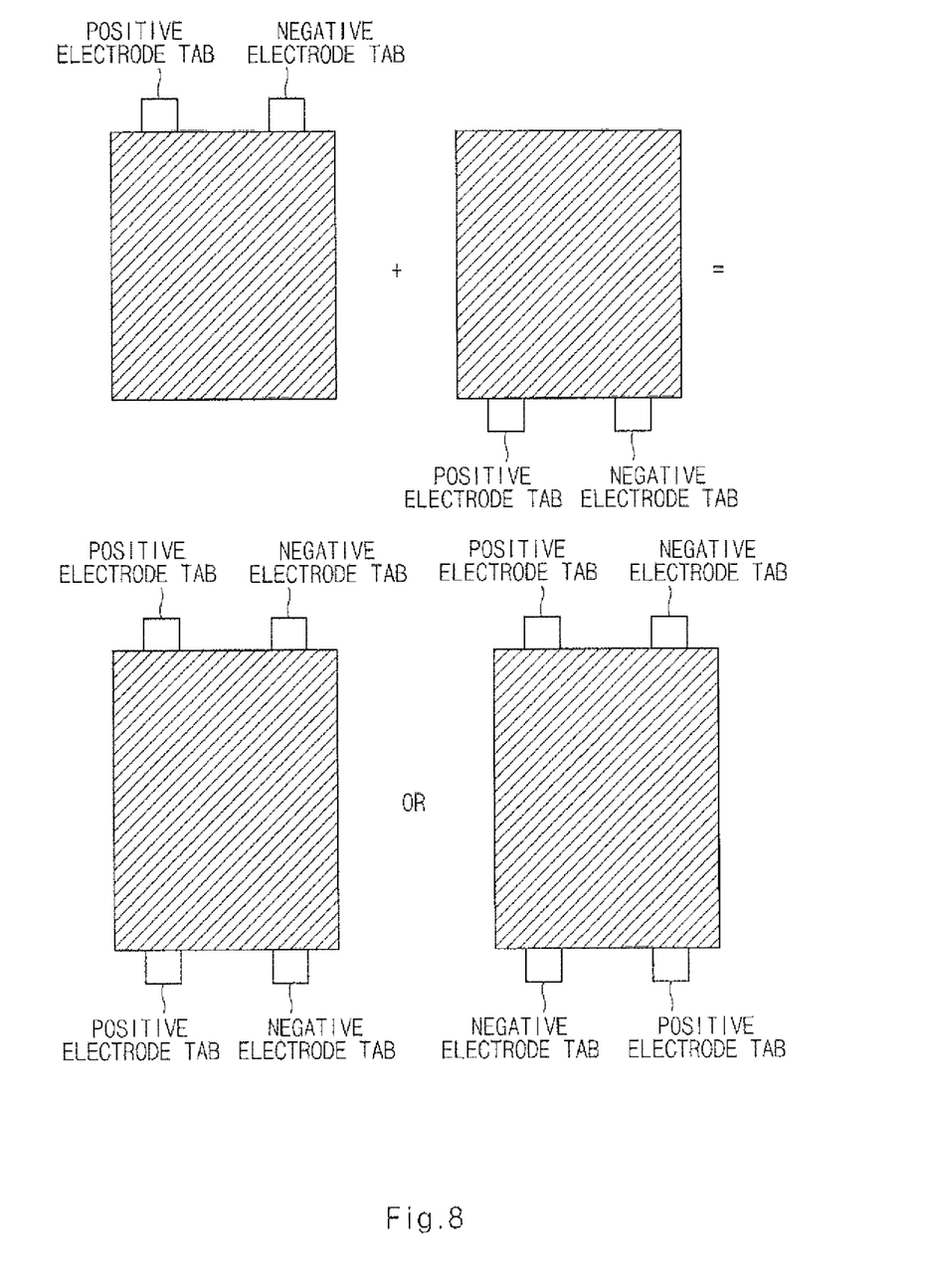
FIG. 8 is a schematic diagram illustrating an electrode assembly in which electrode plates are stacked according to another exemplary embodiment of the present invention.

Further, when a positive electrode tab and a negative electrode tab are provided in the same direction at one side of four sides of an electrode plate, another electrode plate in which axial direction positions of tabs are different is prepared and then by stacking electrode plates so that axial direction positions of tabs are different, an electrode assembly may be complete, as shown in FIG. 8.

In this case, a positive electrode tab and a negative electrode tab are formed in the same direction at one side of four sides of the electrode assembly, and a positive electrode tab and a negative electrode tab are formed at the same position or are formed at an alternate position at a side opposite to the one side.

Figure 9:
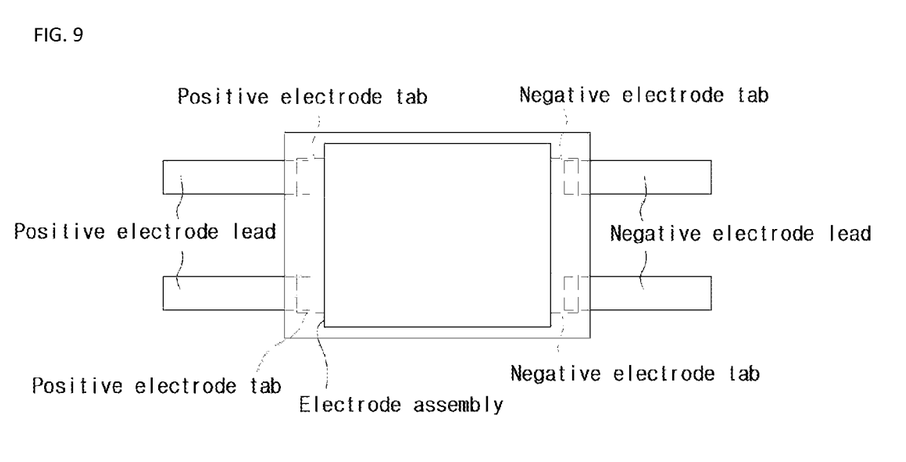
FIG. 9 is a diagram illustrating a structure of an electrode assembly according to an exemplary embodiment of the present invention.
Figure 10:
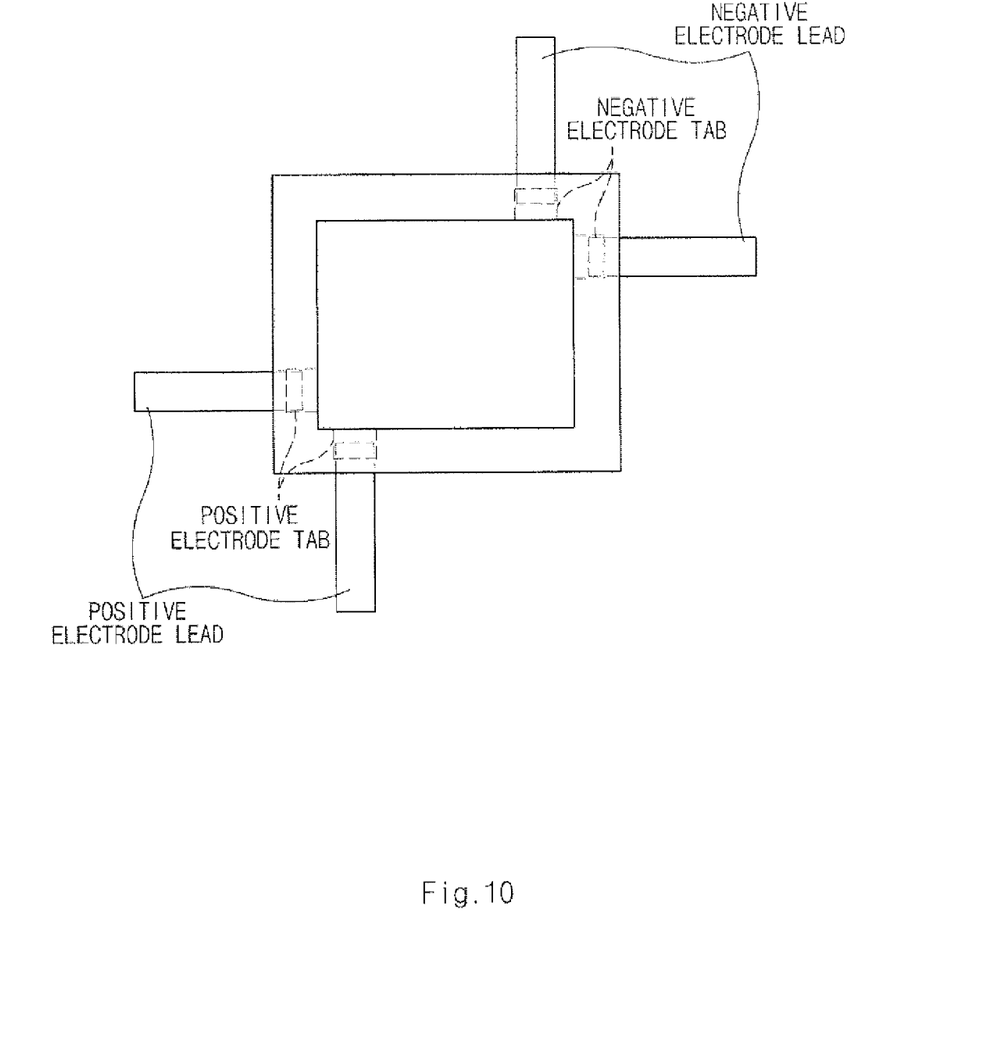
FIG. 10 is a diagram illustrating a structure of an electrode assembly according to another exemplary embodiment of the present invention.

FIGS. 9 and 10 illustrate a structure of a battery manufactured according to an exemplary embodiment of the present invention.

Referring to FIG. 9, unlike a conventional electrode assembly, by welding leads provided at positions corresponding to each tab to electrode assemblies stacked so that tabs of identical electrode plates have different axial direction positions, a positive electrode lead and a negative electrode lead are dividedly formed at each of opposing sides of four sides of the electrode assembly, and thus a battery is complete.

Referring to FIG. 10, the electrode assemblies are stacked so that axial direction positions of tabs of the electrode assembly are positioned, as shown in a lower drawing of FIG. 5, and by welding the tab with a corresponding electrode lead, a positive electrode lead is formed at two adjacent sides of four sides of the electrode assembly and a negative electrode lead is formed at the remaining two sides and thus a battery having a structure of FIG. 10 is complete.

In the foregoing exemplary embodiment, an electrode assembly in which the quantity of positive electrode leads and the quantity of negative electrode leads are at least two and are equal is exemplified, but it is unnecessary that the quantity of positive electrode leads and the quantity of negative electrode leads are at least two and are equal. When the quantity of positive electrode leads and the quantity of negative electrode leads are at least two within an allowable range of a battery, a distribution effect of a current can be more excellent.

In general, a positive electrode plate uses an aluminum foil and a negative electrode plate uses a copper foil, and electrical conductivity of copper is two or more times greater than that of aluminum and thus the quantity of positive electrode leads and the quantity of negative electrode leads may be not equal.

Therefore, the present invention provides a lithium rechargeable battery including an electrode assembly in which a separator and an electrode plate having a current collector, an active material, and a tab are alternately stacked; a lead electrically connected to the tab; and a battery case, wherein the lead is divided into a positive electrode lead and a negative electrode lead, and at least one positive electrode lead and at least one negative electrode lead are provided.

Such an example is shown in FIGS. 11 to 14.

Figure 11:
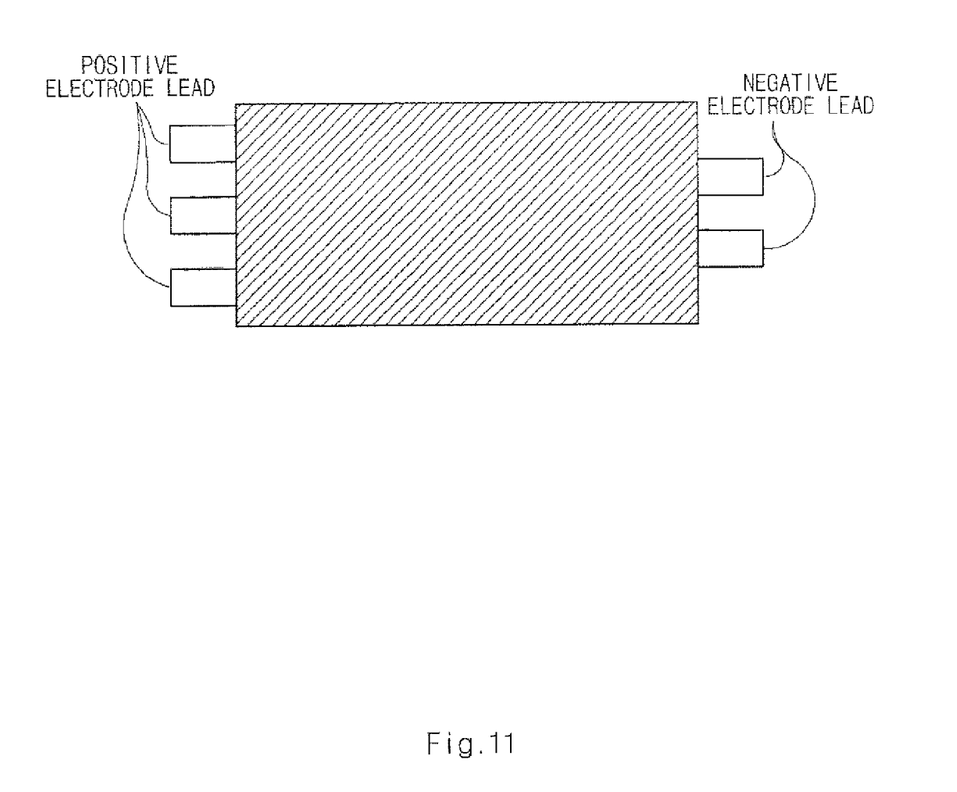
FIGS. 11 to 14 are schematic diagrams illustrating electrode leads formed in several directions of an electrode assembly.
Figure 12:
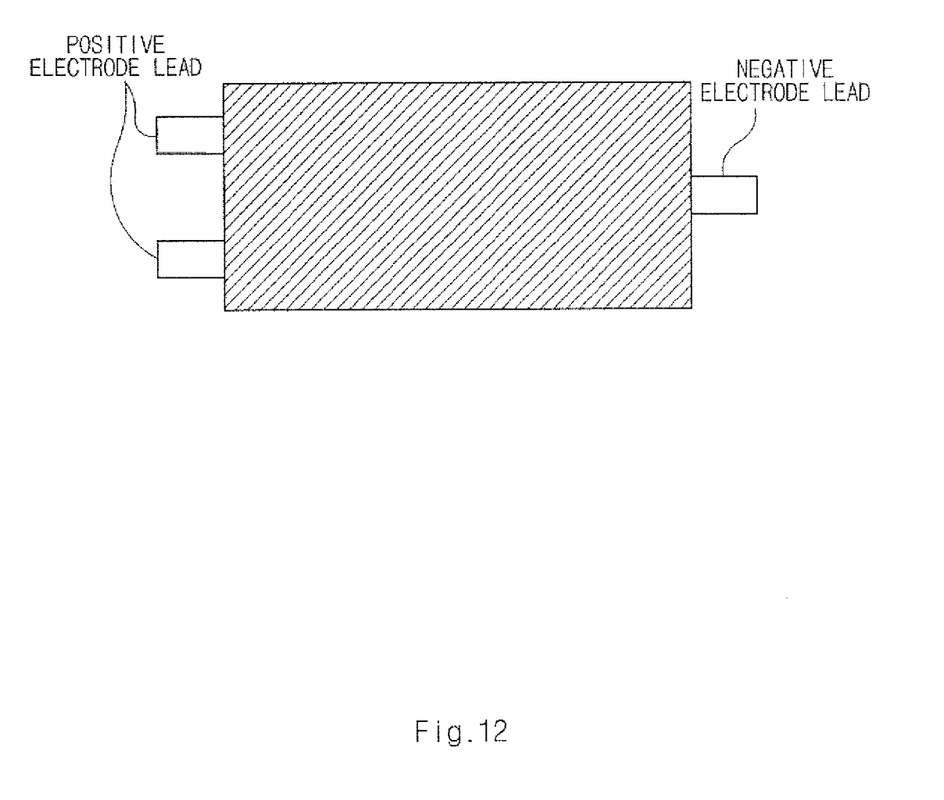

In FIGS. 11 and 12, leads are provided at each of short sides of the electrode plate, three positive electrodes are formed at a short side of one side of the electrode plate and two negative electrodes are formed at the other side thereof, and in FIG. 12, two positive electrode are formed at a short side of one side of the electrode plate and one negative electrode is formed at the other side thereof.

Figure 13:
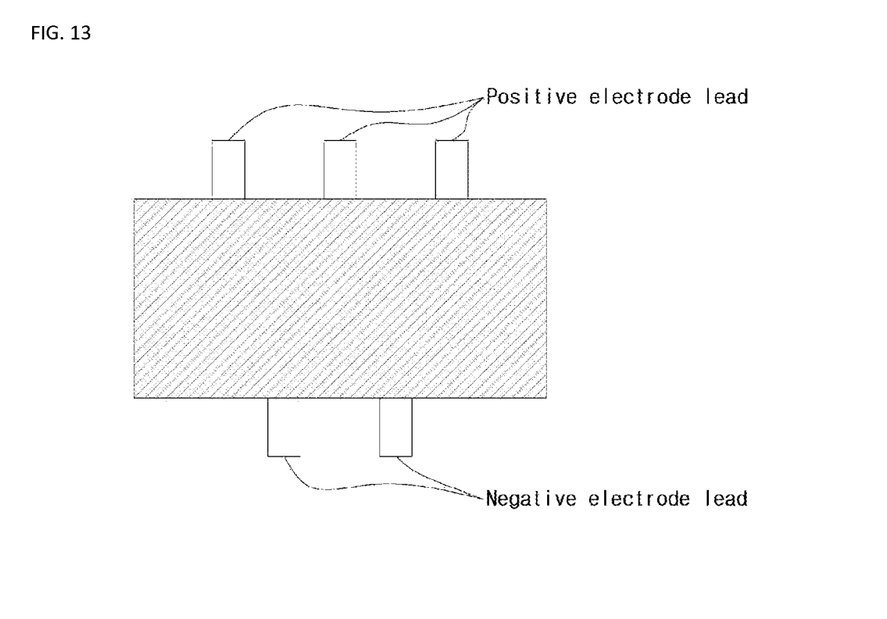
Figure 14:
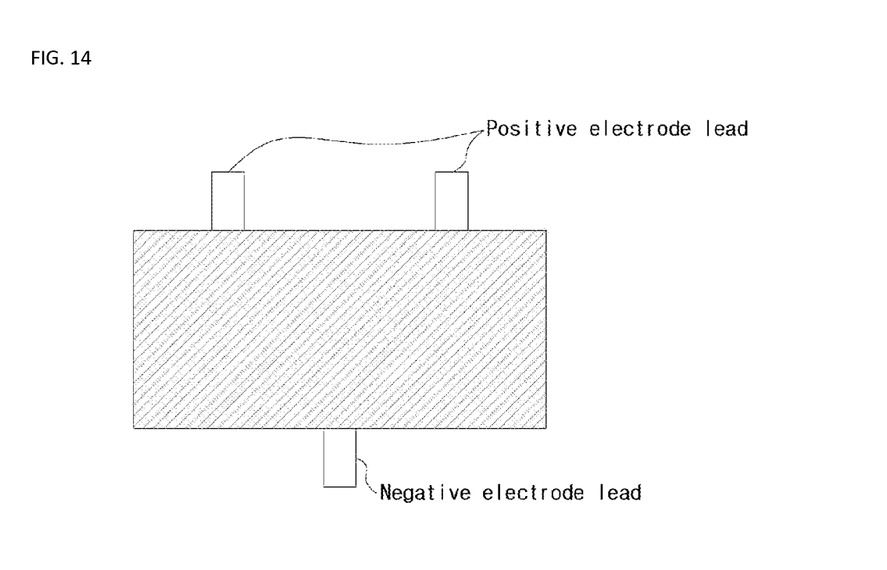

Further, in FIGS. 13 and 14, leads are provided at each of long sides of the electrode plate, in FIG. 13, three positive electrodes are formed at a long side of one side of the electrode plate and two negative electrodes are formed at the other side thereof, and in FIG. 14, two positive electrode are formed at a long side of one side of the electrode plate and one negative electrode is formed at the other side thereof.

In this way, the positive electrode lead and the negative electrode lead may be formed with different quantities and as described above, because copper used as a negative electrode plate has electrical conductivity greater than that of aluminum used as a positive electrode plate, even if the quantity of the negative electrode lead is less than that of the positive electrode lead, there is no problem in exhibiting a function of a rechargeable battery.

In the present invention, a case where a length or a size of a positive electrode lead and a negative electrode lead is equal is exemplified, but the present invention is not limited thereto and a length or a size of a positive electrode lead and a negative electrode lead may be different.

As described above, according to the present invention, a battery is manufactured by alternately stacking electrode plates so that tabs of electrode plates of the same form have different directions and by welding the electrode plates with leads and is appropriate for using a high current even while using a conventional lead-tab size.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A lithium rechargeable battery comprising:
an electrode assembly having a rectangular cross-sectional shape in which a plurality of separators and electrode plates are alternately stacked, the electrode plates including alternating cathode plates and anode plates, each of the electrode plates having a single tab disposed on one side thereof;
leads electrically connected to the tabs; and
a battery case;
wherein the leads are provided on four sides of the electrode assembly, and
wherein the electrode plates are divided into four groups, each group having aligned tabs for collectively coupling to one of the leads such that each electrode plate is coupled to only one of the leads.

2. The lithium rechargeable battery of claim 1, wherein the electrode assembly is formed by alternately stacking electrode plates and separators so that tabs of electrode plates of the same polarity have different positions, and the leads are provided at positions corresponding to the tab positions.

3. The lithium rechargeable battery of claim 1, wherein the electrode assembly is formed by alternately stacking electrode plates and separators so that tabs of electrode plates of different polarity have different positions, and the leads are provided at positions corresponding to the tab positions.

* * * * *